Oct. 12, 1926.
R. H. SULLIVAN
1,602,787
ELECTRIC GENERATOR SYSTEM
Filed Oct. 27, 1925
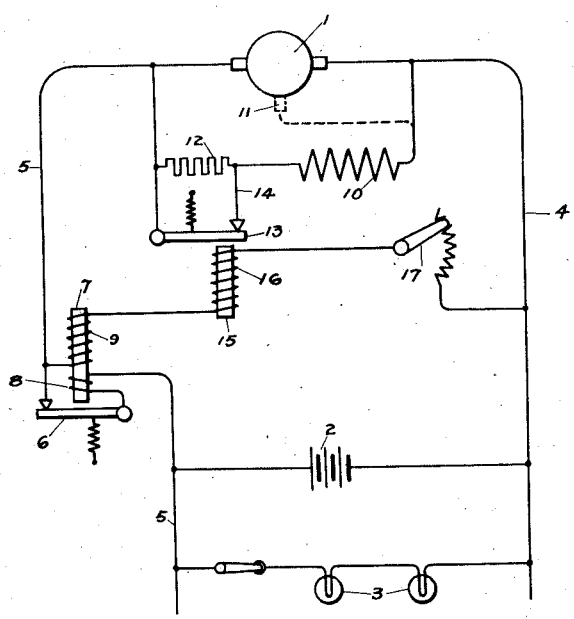
Inventor
Raymond H. Sullivan
by his attorney
Farnum F. Dorsey Patented Oct. 12, 1926.

1,602,787

UNITED STATES PATENT OFFICE.

RAYMOND H. SULLIVAN, OF ROCHESTER, NEW YORK, ASSIGNOR TO NORTH EAST ELECTRIC COMPANY, OF ROCHESTER, NEW YORK, A CORPORATION OF NEW YORK.

ELECTRIC-GENERATOR SYSTEM.

Application filed October 27, 1925. Serial No. 65,194.

This invention relates to systems of the type in which a storage battery is charged by an electric generator, with an electromagnetic cut-out interposed between the battery and the generator to prevent return flow of current from the former to the latter, and in which an electromagnetic regulator is used to control the output of the generator with respect to some function of the voltage across the generator terminals.

Systems of the kind in question are commonly used upon motor vehicles, the generator being driven, at varying speeds, by connection with the mechanism of the vehicle by which it is carried. The present invention is particularly useful in connection with such motor vehicle systems, although not limited to use in that connection.

For the best results, in systems of the kind in question, it has been found desirable to adjust both the regulator and the cut-out to respond accurately to predetermined voltages. The voltages to which they respond should have a definite differential, such as to insure both that the cut-out shall operate as nearly as possible at the point where the generated voltage exceeds the maximum battery voltage, and that the regulator shall maintain a generated voltage enough higher than that to which the cut-out responds, to prevent the cut-out from operating except when it is necessary owing to insufficient speed in the generator. It is common to provide regulators and cut-outs with means by which they may be adjusted to respond to different voltages, and in a system of the kind in question it is therefore possible, with the use of the ordinary means of adjustment, to adjust the system for a higher or lower voltage, as may be desirable under varying conditions of use, and at the same time to maintain the correct differential between the regulator and the cut-out. Such adjustment of the system, however, requires a higher degree of skill and attention than may be expected of those ordinarily in charge of the maintenance of such systems, and the object of the present invention is to provide a system, of the kind in question, with simple and convenient means by which adjustment may be made to change the normal voltage of the system when desirable, and by which the necessary relative adjustment of the regulator and the cut-out will be automatically maintained, so that both instruments shall be adjusted by a single operation, and in the same sense.

To the foregoing end it is proposed to use rheostatic means adjustable by a single member, or through a single manual operation, and connected with the voltage windings of the instrument in such a way that a simultaneous adjustment in the same sense is made in the amount of current flowing through these two windings, under a given voltage across the generator terminals. A single rheostat, connected in a single series with the two windings, is the simplest arrangement for carrying out the invention, but other substantially equivalent arrangements will readily suggest themselves to those skilled in the art.

The accompanying drawing is a diagram of an electric generator system embodying the present invention.

In the system diagrammatically illustrated a generator 1 is shown as connected with a storage battery 2 and with a load circuit including translation devices such as lamps 3, these elements being all connected in parallel across main conductors 4 and 5, the battery being thus "floated on the line," in the manner usual in such systems. Interposed in the main conductor 5 is a cut-out of the ordinary form, comprising an armature 6 and a magnet 7. The magnet has the usual series winding 8 and shunt or voltage winding 9, this latter winding being that which causes the initial closing of the cut-out contacts upon the attainment of a sufficient voltage by the generator.

The output of the generator may be controlled in various ways, but the usual and simplest manner is to control the flow of current through the field winding of the generator.

In the diagram, the generator is shown as provided with a shunt winding 10, which may be connected either across the generator terminals, as shown in full lines, or between one terminal and a supplementary or regulating brush 11, as shown in dotted lines. An external resistance 12 is interposed in the connections between the field winding and the terminals, and this resistance is controlled, in turn, by the regulator, which is shown as of the ordinary vibratory electromagnetic type. The regulator, as shown, comprises a spring-controlled armature 13, and the contacts controlled by this armature 110 are connected in shunt across the resistance 12, so as to control the effect of the latter upon the field circuit in the usual manner. The parts so far described are all well known in their construction and mode of operation, but the novel feature of the system which constitutes the present invention, resides in the use of a manually operable rheostat 17, and in the connection of this rheostat with the voltage windings 9 and 16 in a manner to control the current flowing through these windings. As shown in the diagram, the windings and the rheostat are all in series. In any given position of the rheostat, the cut-out and the generator will respond to predetermined voltages across the main conductors 4 and 5, and by independent adjustment of one or both of the two instruments, by any of the ordinary means, a suitable differential in their critical voltages may be secured. If now it be desired to set the regulator to maintain, for example, a lower voltage across the generator terminals, all that is necessary is to move the rheostat in a direction to reduce the resistance in the circuit controlled by it. This causes a greater current to flow through the series windings under a given impressed voltage, with the result that the generator acts to open its contacts in response to a lower voltage, thus maintaining the generated output at such lower voltage. Since the same movement of the rheostat produces a corresponding effect with relation to the voltage winding of the cut-out, the correct differential between the cut-out and the regulator is maintained at such lower voltage, and thus no direct or independent adjustment of either of the instruments is necessary.

The invention claimed is:—

1. In an electric generator system comprising a generator, a storage-battery charged thereby, an electromagnetic regulator controlling the generator and provided with a voltage winding, a cut-out controlling the connections between the generator and the battery and provided with a voltage winding, and circuit connections between said voltage windings and the terminals of the generator; means, associated with said circuit connections, manually operable to vary the resistance thereof so as to adjust the regulator and the cut-out simultaneously to respond to a higher or lower voltage across the generator terminals.

2. In an electric generator system comprising a generator, a storage battery charged thereby, an electromagnetic regulator controlling the generator and provided with a voltage winding, and a cutout controlling the connections between the generator and the battery and provided with a voltage winding; a rheostat, and circuit connections connecting said voltage windings and said rheostat in series across the generator terminals, so that adjustment of the rheostat varies simultaneously the current flowing through the two voltage windings under a given generated voltage.

RAYMOND H. SULLIVAN.